United States Patent [19]

Iwasawa et al.

[11] 4,369,459
[45] Jan. 18, 1983

[54] SOLID-STATE TELEVISION CAMERA

[75] Inventors: Mineo Iwasawa, Hayama; Yukio Endo; Hiroyuki Yamamoto, both of Yokohama, all of Japan

[73] Assignee: Tokyo Shibaura Denki Kabushiki Kaisha, Japan

[21] Appl. No.: 169,152

[22] Filed: Jul. 15, 1980

[30] Foreign Application Priority Data

Jul. 23, 1979 [JP] Japan .................... 54-92584

[51] Int. Cl.³ .................... H04N 9/09; H04N 3/15
[52] U.S. Cl. .................... 358/50; 358/213
[58] Field of Search ........ 358/43, 44, 50, 52, 358/55, 48, 212, 213, 221, 225, 229, 224, 41

[56] References Cited

U.S. PATENT DOCUMENTS

| | | | |
|---|---|---|---|
| 3,017,454 | 1/1962 | James et al. | 358/55 |
| 3,255,304 | 6/1966 | Bendell et al. | 358/52 |
| 3,586,763 | 6/1971 | Schneider | 358/55 |
| 3,718,751 | 2/1973 | Landre et al. | 358/50 |
| 4,085,419 | 4/1978 | Sekiguchi | 358/55 |
| 4,107,732 | 8/1978 | Adcock et al. | 358/43 |
| 4,166,280 | 8/1979 | Poole | 358/52 |

FOREIGN PATENT DOCUMENTS 52-68314  7/1977  Japan .................... 358/55

OTHER PUBLICATIONS

Inoue et al., "A Color Camera Using Three Area-Scan Charge-Coupled Devices", *NEC Research and Development*, No. 42, pp. 71-79, Jul. 1976.

Sequin et al., *Charge Transfer Devices*, Academic Press, Inc. 1975, pp. 173-178.

Toshiba 2-CCD Color TV Camera, distributed Oct. 1978, Toshiba Corporation.

A Device Structure and Spatial Spectrum for Check-Pattern CCD Color Camera, IEEE Transactions on Electron Devices, vol. ED-25, NO. 2, Feb. 1978, pp. 261-266.

Measurements of Lags in Vidicons Using GaP Red-Emitting Diodes as a Light Source, Japanese Journal of Applied Physics, vol. 10, No. 9, Sep. 1971, pp. 1220-1224.

*Primary Examiner*—John C. Martin
*Attorney, Agent, or Firm*—Finnegan, Henderson, Farabow, Garrett & Dunner

[57] ABSTRACT

A solid-state television camera wherein the generation of synchronous noise is eliminated and the reliability is improved is disclosed which comprises an image taking lens for photographing a subject; an optical member disposed along the optical axis of said lens for reflecting the light from said lens in a direction substantially perpendicular to said optical axis of said lens; a printed circuit board disposed at a position offset from said optical axis of said lens and substantially parallel thereto; a solid-state image pick-up element mounted on said board for receiving the light reflected by said optical member; and various circuit members mounted on said board; the direction for reading out said solid-state image pick-up element being opposite to the usual reading out direction due to an inversion of the light image by said optical member.

13 Claims, 8 Drawing Figures

SOLID-STATE TELEVISION CAMERA

BACKGROUND OF THE INVENTION

The present invention relates to television cameras and more particularly to solid-state television cameras which use solid-state image pick-up elements.

The solid-state image pick-up element is compact in size and light in weight in comparison with image pick-up tubes which have been conventionally used in television cameras. Thus, its use is very effective for manufacturing a television camera which is compact in size and light in weight. Therefore, it is expected that these solid-state image pick-up elements will be used especially for shoulder cameras which are carried on the shoulders of cameramen.

In general, it is preferable for a shoulder camera to have an outer shape such that the camera may be set on the shoulder of a cameraman in a stable manner to facilitate easy and smooth operation. Such an outer appearance requires that it be short in the direction perpendicular to the optical axis of the camera, and long in the direction along the optical axis. The ratio of these lengths must be able to be arbitrarily selected.

However, a conventional solid-state television camera is so constructed that a printed circuit board having a solid-state image pick-up element such as a CCD (charge coupled device) and its peripheral circuits is arranged in a direction perpendicular to the optical axis of the camera, and the incident light is introduced to the solid-state image pick-up element directly. Consequently, the outer shape of the camera is such that it is long in the direction perpendicular to the optical axis of the camera. Thus, this type of camera is difficult to use as a shoulder camera and is usually supported on a tripod.

An example of a conventional solid-state television camera with such a shape is schematically shown in FIG. 1. In FIG. 1, the camera is shown from above with its upper cap removed. In the television camera shown in FIG. 1, an image taking lens 1 is disposed in front of the camera, and behind the camera is disposed a printed circuit board 2 on which are in turn mounted a CCD 3 and its peripheral circuits in a direction perpendicular to the optical axis of the lens 3. Behind the camera further are disposed printed circuit boards 4, 5, 6, 7 and 8 on which are mounted digital circuits, image signal processing circuits and so on. In addition to the CCD 3, many components such as a driving circuit, an input and output circuit and so on are arranged on the printed circuit board 2 in the immediate vicinity of the CCD 3 to provide various electrical characteristics. Thus, the printed circuit board 2 must be arranged in a direction perpendicular to the optical axis as shown in FIG. 1, resulting in an outer shape unsuitable for a shoulder camera as has been described above.

Besides its outer shape, the conventional solid-state television camera as shown in FIG. 1 has problems as described below. The terminals of the printed circuit board 2 with the CCD 3 mounted on it are connected to the terminals of the printed circuit boards 4 and 8 on which are mounted digital circuits, image signal processing circuits and so on. Thus, a considerable space is required for wiring between each printed circuit board, and especially between the printed circuit board 2 and the printed circuit boards 4 and 8, adversely affecting the compactness of the television camera. Further, since the number of printed circuit boards is large, the number of input and output connectors for the printed circuit boards is also large. The reliability is degraded due to the large number of connection points between each printed circuit board and synchronous noise is increased due to long wiring. The generation of such synchronous noise may be explained in the manner described below. Clock pulses must be supplied to a transfer electrode for actuating the solid-state image pick-up element 3, ans this supply of the clock pulses may be performed by a clock pulse generating circuit (clock driver) generally disposed inside the camera. An equivalent circuit for the transfer electrode in this case is a capacitor. When a pulse current is supplied to this capacitor, a large discharge current resulting from the change in the pulse voltage flows through the wiring. This discharge current electrostatically or electromagnetically generates outer radiation, adversely affecting the wiring. When the wiring is long, the impedance is made greater. This results in the generation of noise (synchronous noise) due to the above-mentioned outer radiation and this noise appears on the screen.

For better performance or higher resolution in a solid-state television camera, it is also known to use a bias light. However, in a conventional solid-state television camera as shown in FIG. 1, the CCD 3 is arranged in a drection perpendicular to the optical axis. Thus the bias light must be arranged between the image taking lens 1 and the CCD 3. This requires additional space, resulting in a bigger camera.

The television camera shown in FIG. 1 is a monochrome solid-state television camera using a single solid-state television image pick-up element. However, in the case of a two-plate type solid-state television camera using two solid-state image pick-up elements, an optical system is required for dividing the light from the image taking lens 1, and two CCDs are required for receiving the divided light rays. In such a case, one of the CCDs is arranged at a constant angle with respect to the optical axis. This arrangement of two CCDs requires more space. In general, a shoulder camera does not adopt a system in which the image taking lens is oriented toward the subject while viewing through the viewfinder, but a system in which the camera is manipulated while viewing the subject with the naked eye. Thus, it is sometimes impossible to photograph an intended subject which is very close. In order to prevent this problem, it is preferable that the shoulder camera be operable while viewing through the viewfinder. However, since the CCD 3 is arranged in a direction perpendicular to the optical axis in the conventional camera shown in FIG. 1, it is difficult to adopt a system which uses a viewfinder.

SUMMARY OF THE INVENTION

An object of the present invention is therefore to provide a solid-state television camera which may be made compact in size, and which requires a smaller number of printed circuit boards to be arranged inside the camera body.

Another object of the present invention is to provide a solid-state television camera wherein the generation of synchronous noise is eliminated and the reliability is improved.

To the above and other ends, the present invention provides a solid-state television camera which comprises an image taking lens for photographing a subject; an optical member disposed along said optical axis of said lens for reflecting the light from said lens in a direction substantially perpendicular to said optical axis; a printed circuit board arranged at a position offset from said optical axis of said lens and substantially parallel thereto; a solid-state image pick-up element mounted on said board for receiving the light reflected by said optical member; and various circuit members mounted on said board; the direction for reading out from said solid-state image pick-up element being opposite to the usual direction for reading out due to the inversion of the light image by said optical member.

DETAILED DESCRIPTION OF THE PREFERRED EMBODIMENTS

Several embodiments of the present invention will now be described referring to the accompanying drawings.

Figure 2:
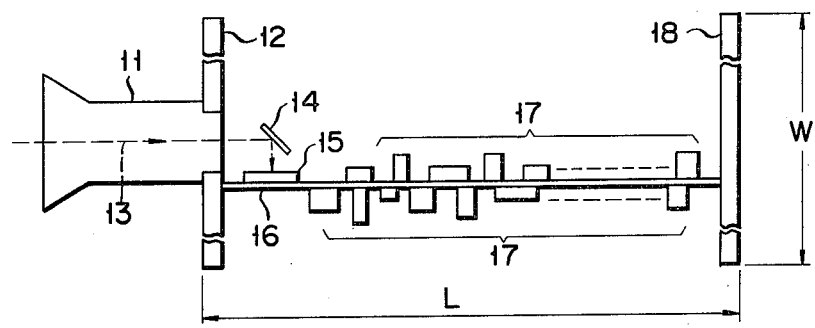
FIG. 2 is a schematic view of a solid-state television camera in accordance with an embodiment of the present invention.

FIG. 2 is a schematic view as seen from above of a solid-state television camera in accordance with an embodiment of the present invention. In FIG. 2, an image taking lens 11 is secured to a front plate 12. Incident light following the optical axis 13 of the lens 11 is reflected by a reflective mirror 14 and reaches a solid-state image pick-up element 15 which comprises, for example, a CCD. That is, an optical image of a subject is formed on the input surface of the CCD 15. The CCD 15 is attached to the end of a printed circuit board 16. On the front and back surfaces of the printed circuit board 16 are arranged, in addition to the CCD 15, circuits 17 including peripheral circuits such as a driving circuit and an input and output circuit; a digital circuit; and an image signal processing circuit. The ends of the printed circuit board 16 are secured to the front plate 12 and the back plate 18, respectively.

With the above construction, the solid-state image pick-up element 15, its peripheral circuits and various other circuits may be mounted on a single printed circuit board. Consequently, the length L of the camera along the optical axis of the image taking lens 11 may be made longer than the width W of the camera along the direction perpendicular to the optical axis. The width W may be further shortened than the conventional case. This results in an outer shape which is preferable for a shoulder camera. FIG. 2 shows a case in which all of the circuit parts are mounted on the printed circuit board 16. However, when all of the circuit boards cannot be mounted on a single printed circuit board, another printed circuit board 19 may be arranged parallel to the printed circuit board 16, and the extra circuit parts may be mounted on it as in the camera shown in FIG. 3. In a camera of the construction shown in FIG. 3, the length L may be made longer than the width W similarly as in the camera of FIG. 2, thus providing an outer shape which is suitable for a shoulder camera.

Figure 1:
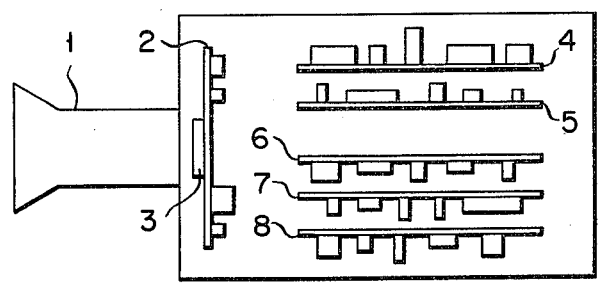
FIG. 1 is a schematic view of a conventional solid-state television camera.
Figure 3:
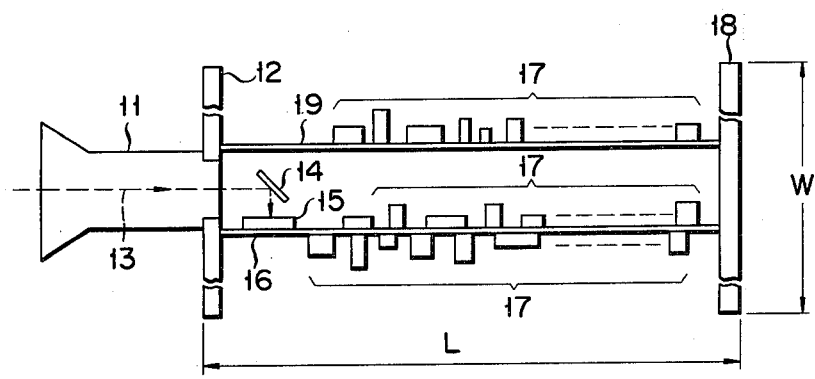
FIG. 3 is a schematic view of a solid-state television camera in accordance with another embodiment of the present invention which has two printed circuit boards.

In a camera of either of the constructions shown in FIGS. 2 and 3, many other circuits may be mounted on the printed circuit board for mounting the solid-state image pick-up element. Thus, as compared with the conventional camera shown in FIG. 1, the space inside the camera may be vastly decreased. Thus, the dimensions L and W may be freely selected and an outer shape suitable for a shoulder camera is maintained.

The reading out process of the solid-state image pick-up element 15 in the solid-state television camera shown in FIG. 2 will now be described. As has been described, the output light transmitted by the image taking lens 11 is reflected by the reflective lens 14 and is projected onto the solid-state image pick-up element 15. The image formed on the solid-state image pick-up element 15 is inverted transversely with respect to the output light (subject light) from the image taking lens 11. Thus, the reading out from the solid-state image pick-up element 15 must be done in a direction transversely opposite to the direction of general reading out which does not use a conventional reflective mirror 14. For this purpose, a shift resistor may be used to change the transfer direction of the CCD, and an ON chip preamplifier is arranged at a side opposite to the general side.

The solid-state television camera of the present invention as described has many other advantages in addition to its outer shape.

First, in the television camera of the present invention, the printed circuit board 16 is arranged parallel to the optical axis, and the solid-state image pick-up element 15 and the other circuit parts 17 are mounted on this printed circuit board 16. Therefore, outer wiring is not necessary, resulting in a big decrease in synchronous noise. Further, as shown in FIG. 3, even when two printed circuit boards are used, synchronous noise may be decreased greatly as compared with the conventional television camera shown in FIG. 1. Since the number of printed circuit boards can be made smaller, the number of terminals for the printed circuit boards may also be decreased, resulting in the elimination of bad electrical contact between terminals and improved reliability of the camera.

Figure 4:
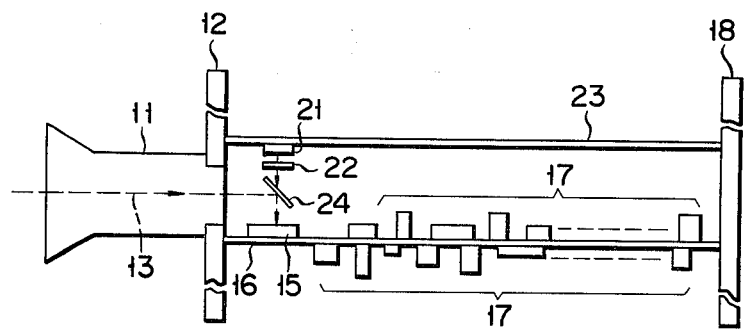
FIG. 4 is a schematic view of a solid-state television camera in accordance with still another embodiment of the present invention which uses a bias light.

Second, in the television camera of the present invention, the incorporation of the bias light source is easy, and due to the use of the bias light, the camera itself may not have to be made large in size and the transfer efficiency of the solid-state image pick-up element may be improved. Thus, output images of high resolution may be obtained. FIG. 4 shows an example in which a bias light source is assembled in the television camera. In FIG. 4, a bias light source 21 is mounted on a substrate 23 in opposition to the solid-state image pick-up element 16. The bias light from the bias light source 21 is transformed into a uniform beam by a diffusion plate 22 and reaches a solid-state image pick-up element 24 through an optical member 24. The substrate 23 with the bias light source 21 mounted thereon may also serve as a printed circuit board as shown in FIG. 3. The optical member 24 reflects light from the image taking lens 11 and transmits the light from the bias light source 21 through the diffusion plate 22. Such an optical member may comprise, for example, a cold mirror. This cold mirror transmits the infrared light and reflects the visible light. With such a construction, the bias light source may easily be assembled in the television camera. Further, by arranging the bias light source 21 in such a manner that the optical axis of the bias light is perpendicular to the optical axis 13 of the lens 11, the generation of shading due to the use of the bias light may be eliminated.

Figure 5:
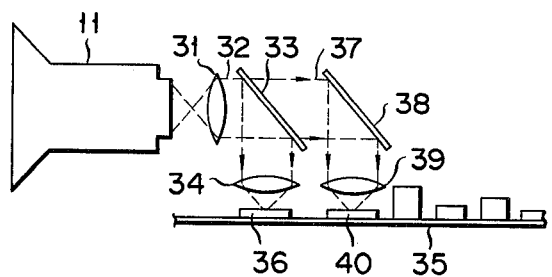
FIG. 5 is a schematic view of a solid-state television camera in accordance with still another embodiment of the present invention as applied to a two-plate type color television camera.

Thirdly, the television camera of the present invention shows superior effects when applied to a color television camera. FIG. 5 shows a case in which the present invention is applied to a two-plate type color television camera. In the camera shown in FIG. 5, a relay lens 31, a dichroic mirror 33 and a reflective mirror 38 are arranged coaxially with the optical axis of the lens 11. The light from the image taking lens 11 is transformed into a parallel beam 32 by the relay lens 31. The blue and red light is reflected by the dichroic mirror 33, and the green light is transmitted therethrough. The blue and red light reflected by the dichroic mirror 33 is projected through a first focus lens 34 onto a first solid-state image pick-up element 36 mounted on a printed circuit board 35. The green light beam 37 transmitted through the dichroic mirror 33 is reflected by the reflective mirror 38 and is projected through a second focus lens 39 onto a second solid-state image pick-up element 40 mounted on a printed circuit board 35. With the above construction, a solid-state color television camera with an outer shape suitable for a shoulder camera may be easily obtained. With this camera, the synchronous noise is eliminated as in the camera shown in FIG. 2, and the use of the bias light is easy in the camera shown in FIG. 4.

Figure 6:
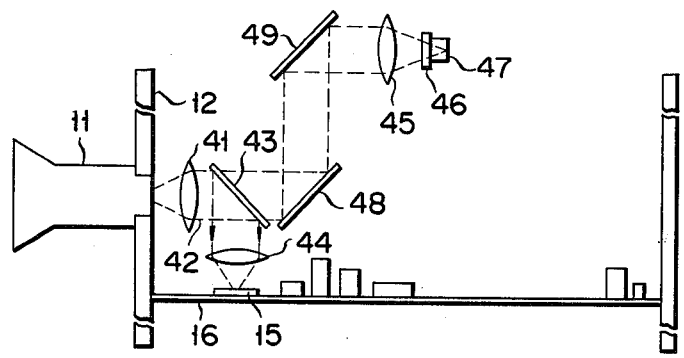
FIG. 6 is a schematic view of a solid-state television camera in accordance with still another embodiment of the present invention which uses a finder system.

Fourthly, in the television camera of the present invention, a finder system may easily be adopted. FIG. 6 shows an example of a monochrome television camera with a finder system. In FIG. 6, the light from the image taking lens 11 is transformed into a parallel beam 42 by a relay lens 41. This parallel beam 42 is partially reflected by a half mirror 43, and is partially transmitted through the half mirror 43. The light reflected by the half mirror 43 passes through a focus lens 45 and becomes incident on the solid-state image pick-up element 15. The light which is transmitted by the half mirror 43 is projected on a finder 47 through reflective mirrors 48 and 49, a focus lens 45 and a filter 46. The hald mirror 43 preferably reflects more light than it transmits in contrast to a half mirror which transmits 50% of the light and reflects 50% of the light. Thus, in the television camera of the present invention, since the printed circuit board with the solid-state image pick-up element mounted thereon is arranged to be parallel to and offset from the optical axis of the image taking lens, part of the light from the image taking lens may be easily taken out so as to facilitate the adoption of the finder system. FIG. 6 shows a construction in which part of the light from the image taking lens is guided toward the side of the camera and a finder is arranged at a position which may be easily viewed by the naked eye when the camera is set on the shoulder of a cameraman. The present invention is not limited to this construction, and a construction may be adopted, for example, in which part of the light from the image taking lens is guided toward the back of the camera and a finder is arranged on the back plate.

Figure 7:
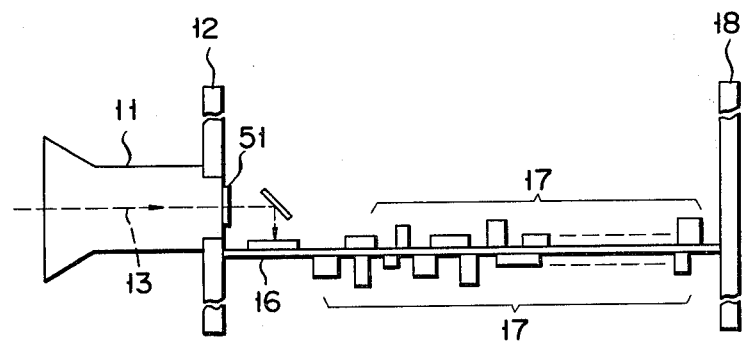
FIG. 7 is a schematic view of a solid-state television camera in accordance with still another embodiment of the present invention which has an infrared-cut filter.
Figure 8:
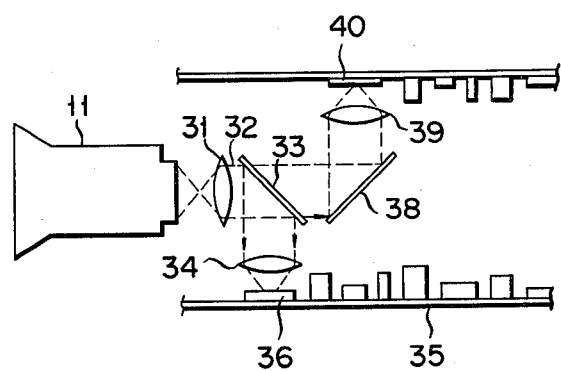
FIG. 8 is a schematic view of a modification of the solid-state television camera shown in FIG. 5.

Thus, the present invention is not limited to the particular embodiments described above, and many modifications may be made without departing from the spirit and scope of the present invention. For example, as shown in FIG. 7, the sensitivity may be made uniform over the entire wavelength by disposing a filter 51 behind the image taking lens 11 and guiding the light from the lens 11 through the filter 51. The filter 51 may, for example, comprise an infrared-cut filter for blocking the infrared rays outside the visible range. In the color television camera of FIG. 5, two solid-state image pick-up elements are disposed on only one printed circuit board. However, as shown in FIG. 8, each solid-state image pick-up element may be disposed on its own printed circuit board. With such a construction, it is easy to dispose the corresponding peripheral circuits such as the clock driver in the vicinity of each element. Further, although the color television camera shown in FIG. 5 is of the two-plate type, the present invention may also be easily applied to a three-plate type or a four-plate type color television camera.

What we claim is:

1. A shoulder-carried solid-state television camera which comprises an image taking lens for photographing a subject; optical means disposed along the optical axis of said lens for reflecting light from said lens in a direction substantially perpendicular to said optical axis of said lens; one or more printed circuit boards disposed at a position or positions offset from said optical axis of said lens and substantially parallel thereto; one or more solid-state image pick-up elements, with all of the pick-up elements of said camera mounted on one or more of said boards for receiving the light reflected by said optical means; and various circuit members mounted on one or more of said boards; the direction for reading out said solid-state image pick-up elements being opposite to the usual reading out direction due to an inversion of the light image by said optical means; the width W of said camera being, accordingly, independent of the length of said printed circuit boards and the length L of the camera along the optical axis of the image taking lens being longer than the width W of the camera along the direction perpendicular to the optical axis.

2. A solid-state television camera as recited in claim 1 wherein said optical means is a reflective mirror.

3. A solid-state television camera as recited in claim 1 wherein said solid-state image pick-up elements are charge coupled elements.

4. A solid-state television camera as recited in claim 1 wherein said circuit members include a driving circuit and an input and output circuit for said solid-state image pick-up elements.

5. A solid-state television camera as recited in claim 1 wherein said optical means is a cold mirror, a bias light source is disposed beyond said cold mirror opposite to one of said solid-state image pick-up elements, the light from said image taking lens is reflected by said cold mirror and guided to said solid-state image pick-up element, and the bias light from said bias light source is transmitted through said cold mirror and is irradiated on said solid-state image pick-up element.

6. A solid-state television camera as recited in claim 5 wherein a diffusion plate is interposed between said bias light source and said optical member.

7. A solid-state television camera as recited in claim 1 including first and second solid-state image pick-up elements and wherein said optical means comprises a dichroic mirror and a reflective mirror disposed along the optical axis of sid image taking lens, the light reflected by said dichroic mirror is guided to said first solid-state image pick-up element and the light transmitted through said dichroic mirror is reflected by said reflective mirror and guided to said second solid-state image pick-up element.

8. A solid-state television camera as recited in claim 7 wherein a focus lens is interposed between said dichroic mirror and said first solid-state image pick-up element and another focus lens between said reflective mirror and said second solid-state image pick-up element.

9. A solid-state television camera as recited in claim 1 wherein a finder is further included and part of the light from said image taking lens is guided to said finder.

10. A solid-state television camera as recited in claim 1 wherein an infrared-cut filter is interposed between said image taking lens and said optical means.

11. A solid-state television camera as recited in claim 7 wherein both said first and second solid-state image pick-up elements are located on the same printed circuit board.

12. A solid-state television camera as related in claim 7 wherein said first and second solid-state pick-up elements are each located on different printed circuit boards.

13. A solid-state television camera as recited in claim 7, 11 or 12 further including an optical member disposed along the optical axis of said lens for transforming light from said lens into parallel rays.

* * * * *

UNITED STATES PATENT AND TRADEMARK OFFICE
CERTIFICATE OF CORRECTION

PATENT NO. : 4,369,459
DATED : January 18, 1983
INVENTOR(S) : IWASAWA ET AL.

It is certified that error appears in the above-identified patent and that said Letters Patent are hereby corrected as shown below:

Claim 5, column 6, line 58 delete "said optical means is a cold mirror,";

line 59 change "cold mirror" to --optical means--;

line 61, change "cold" to --optical means--;

line 62 delete "mirror"; and line 64 change "cold mirror" to --optical means--.

Claim 6, column 6, line 68 change "member" to --means--.

Signed and Sealed this

Twenty-first Day of June 1983

|SEAL|

Attest:

DONALD J. QUIGG

Attesting Officer     Acting Commissioner of Patents and Trademarks